US008611436B2

(12) United States Patent
Knierim et al.

(10) Patent No.: US 8,611,436 B2
(45) Date of Patent: Dec. 17, 2013

(54) WIDEBAND BALUN STRUCTURE

(75) Inventors: Daniel G. Knierim, Beaverton, OR (US); James S. Lamb, Portland, OR (US); Josiah A. Bartlett, Forest Grove, OR (US)

(73) Assignee: Tektronix, Inc., Beaverton, OR (US)

(*) Notice: Subject to any disclaimer, the term of this patent is extended or adjusted under 35 U.S.C. 154(b) by 166 days.

(21) Appl. No.: 13/341,916

(22) Filed: Dec. 31, 2011

(65) Prior Publication Data

US 2013/0022133 A1 Jan. 24, 2013

Related U.S. Application Data

(60) Provisional application No. 61/509,365, filed on Jul. 19, 2011.

(51) Int. Cl.
*H04B 3/00* (2006.01)

(52) U.S. Cl.
USPC ........... 375/257; 375/258; 375/219; 375/295; 375/316

(58) Field of Classification Search
USPC .......................... 375/257, 258, 219, 295, 316
See application file for complete search history.

(56) References Cited

U.S. PATENT DOCUMENTS

| | | | | |
|---|---|---|---|---|
| 5,345,471 | A * | 9/1994 | McEwan | 375/130 |
| 5,764,195 | A * | 6/1998 | Colclough et al. | 343/797 |
| 5,945,890 | A * | 8/1999 | McCorkle | 333/26 |
| 6,844,792 | B1 * | 1/2005 | Koeppe et al. | 333/24 R |
| 7,961,048 | B2 * | 6/2011 | Oakley et al. | 330/295 |
| 8,125,270 | B2 * | 2/2012 | Zanchi et al. | 330/69 |
| 2003/0048500 | A1 * | 3/2003 | Fala et al. | 359/110 |
| 2004/0189419 | A1 * | 9/2004 | Essenwanger | 333/26 |
| 2005/0084033 | A1 * | 4/2005 | Rosen et al. | 375/295 |
| 2005/0200425 | A1 * | 9/2005 | McKay et al. | 333/26 |
| 2006/0290441 | A1 * | 12/2006 | Samavati | 333/25 |
| 2009/0258617 | A1 * | 10/2009 | Yoshihara | 455/127.1 |

* cited by examiner

*Primary Examiner* — Kenneth Lam

(74) *Attorney, Agent, or Firm* — William K. Bucher; Marger Johnson & McCollom PC

(57) ABSTRACT

A balun structure is disclosed having positive and negative going signal paths coupled to a ninety degree hybrid. The positive signal path has a circuit trace and a phase shaper structure that provides three hundred and sixty degrees of phase shift at Port 1 of the hybrid. The negative going signal path has a circuit trace and a second order phase shaper that provides four hundred and fifty degrees of phase shift at Port 2 of the hybrid. Port 1 is coupled to Port 3 of the hybrid and functions as an output port. The first order phase shaper and the second order phase shaper compensate for the signal loss caused by a signal cable coupled to the output port and provide a frequency band from DC to at least 15 GHz and a transient response having less than ten percent pre-shoot.

4 Claims, 7 Drawing Sheets

WIDEBAND BALUN STRUCTURE

CROSS-REFERENCE TO RELATED APPLICATIONS

This application claims the benefit of priority of U.S. Provisional Application No. 61/509,365, filed Jul. 19, 2011 and incorporates by reference herein the contents of U.S. Provisional Application No. 61/509,365 as if such contents were set forth in full herein.

BACKGROUND OF THE INVENTION

Broadband DC-coupled amplifiers are generally designed with differential inputs and outputs for reasons such as power supply (and other common-mode) noise immunity, cancelation of even-order harmonic distortion, cancelation of DC offset terms, increased dynamic range due to swing on both outputs, etc. For interconnect between amplifiers on one die, one package, or even on one circuit board, the expense of the differential interconnect is small compared to the advantages of differential design. However, for interconnect between modules, such as between an active probe and an oscilloscope, the cost of differential interconnects are often prohibitive. Not only would two coaxial cables be required rather than one (adding cost and bulk, and reducing flexibility), but the two would also need to be tightly matched to prevent mode conversion from differential to common-mode and vice versa.

Various passive interconnect structures are known that convert between single-ended and differential signals, often called "baluns" in time-domain applications and/or "180° hybrids" in frequency-domain applications. Broadband, DC-coupled passive baluns are limited to a loss of at least 3 dB, as at DC no energy can be coupled with capacitive or inductive coupling to the "inverted" output, and hence half of the single-ended input power appears as "wasted" common-mode energy at the differential output. (Equivalently, for a balun converting a differential input to a single-ended output, half the differential power in the "inverted" input cannot be coupled to the output, and thus is lost. This symmetry can also be inferred from reciprocity of passive elements with the power loss of a passive balun structure is independent of whether it is used to convert balanced to unbalanced or vice versa.

Generally, baluns are designed for RF applications and little or no consideration is given to the transient response of the balun. The transient response in such device may have substantial pre-shoot or pre-shoot and over shoot. However, in certain application, such as a signal acquisition system having a differential signal acquisition probe coupled to oscilloscope, the transient response of the balun should have little or no pre-shoot. Further, the balun needs to have a wide bandwidth extending down to DC for coupling a wide range of differential signal to the oscilloscope. In addition, the balun should provide compensation for signal losses in the signal cable of the signal acquisition probe system.

SUMMARY OF THE INVENTION

The wideband balun of the present invention compensates for signal loss caused by a signal cable in signal acquisition probe system, extends the bandwidth of the wideband balun from DC to system response of at least 15 GHz, and has a transient response having a pre-shoot of no more than ten percent. The wideband balun has a first signal path for a positive going differential signal and a second signal path for a negative going differential signal. A ninety-degree hybrid is coupled to the first signal path for receiving the positive going differential signal at a first port and coupled to the second signal path for receiving the negative going differential signal at a third port. The first port is coupled to a second port of the ninety-degree hybrid coupled and functions as an output port and a fourth port of the ninety-degree hybrid coupled to the third port and coupled to signal ground via a termination resistor. A signal cable coupled to the output port of the ninety degree hybrid with the first signal path having a first phase shaper and the second signal path having a second order phase shaper for compensating for the signal loss caused by the signal cable and providing a frequency band from DC to at least 15 GHz and a transient response having less than ten percent pre-shoot.

The first signal path of the wideband balun has a circuit trace providing a lambda-over-two phase shift and the first phase shaper providing a lambda-over-two phase shift resulting in a three hundred and sixty degree phase shift at the first port of the ninety degree hybrid. The second signal has a circuit trace providing a lambda-over-four phase shift and the second order phase shaper providing a lambda-over-two phase shift resulting in a two hundred and seventy degree phase shift at the output of the second order phase shifter which when added to the one hundred and eighty degree phase shift of the negative going differential signal results in a four hundred and fifty degree phase shift at the third port of the ninety degree hybrid. The wideband balun is preferably formed as a stripline structure.

The objects, advantages and novel features of the present invention are apparent from the following detailed description when read in conjunction with appended claims and attached drawings.

DETAILED DESCRIPTION OF THE INVENTION

The wideband balun of the present invention uses phase shifters, phase shapers and a 90° hybrid to phase shift the negative going signal of a differential signal 180° at the output of the 90° degree hybrid. When using 90° hybrid to couple a differential amplifier output through a single-ended cable to a single-ended input or equivalently a single-ended amplifier output through a single-ended cable to a differential input, the 3 dB power loss at DC may be used to compensate for up to 3 dB of cable loss due to high-frequency attenuation in the cable resulting from skin-effect and/or dielectric adsorption. Put another way, the otherwise-wasted high-frequency power may be used in the otherwise-unused output side, coupled through the hybrid, to make up the cable loss, and thus maintain an overall flat response without the additional noise or dynamic range penalties of active cable compensation circuits.

The phase shift networks consisting of phase shifter and phase shapers may be used in one or both legs to broaden or narrow the 90 ° hybrid's frequency range. In this case, the range is tuned to match the loss in the cable, so as to flatten the system magnitude-vs-frequency response. Again, phase shift networks may be used in the single-ended path or both legs of the differential path to tune system phase-vs-frequency response.

Figure 1:
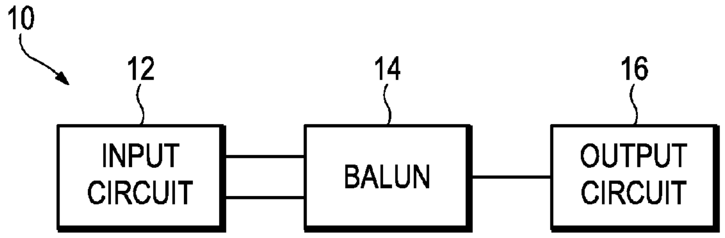
FIG. 1 is a block diagram of an electrical system suitable for use with the wideband balun structure according to the present invention.

Referring to FIG. 1, there is shown a block diagram of an electrical system 10 having an input circuit 12, a balun 14 and an output circuit 16. For the purposes of this disclosure, a circuit can be any electrical device having electrical characteristics, such as magnitude versus frequency and phase versus frequency characteristics. The system 10 has an overall system characteristics defined by the input and output circuits 12 and 16 and the balun 14. The balun 14 according to the present invention has magnitude and phase characteristics that are user defined to set the overall characteristics of the system 10.

Figure 2:
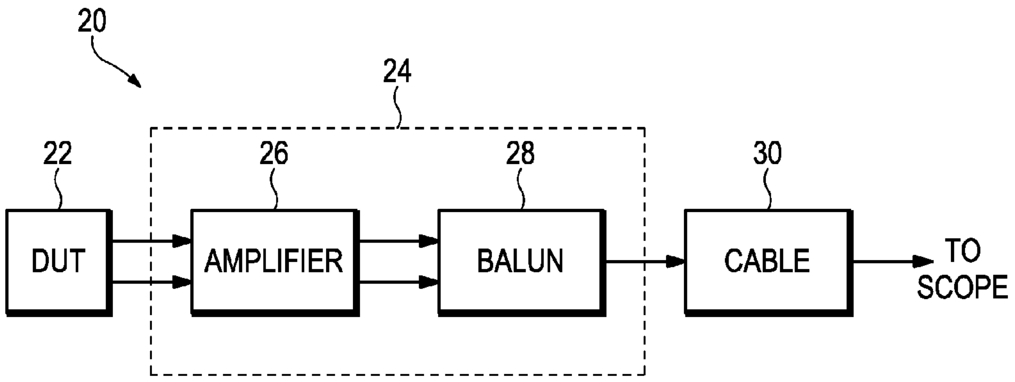
FIG. 2 is a block diagram of a signal acquisition probe system using the wideband balun structure according to the present invention.

FIG. 2 is block diagram of a signal acquisition probe system 20 for acquiring a signal from a device under test (DUT) 22 and coupling the test signal to a measurement test instrument, such as an oscilloscope, logic analyzer and the like. The probe system 20 has a probing head 24 having probing tips or probing cables extending therefrom for connecting to test points on the DUT 22. The differential signal under test is coupled to amplifier circuitry 26 in the probing head 24 that amplifies and conditions the test signal for transfer to the measurement test instrument. The output of the amplifier circuitry 26 is coupled to differential inputs of balun 28. The balun 28 converts the differential input signal to a single ended output signal. The output signal is coupled to a probe cable 30 which is connected to the measurement test instrument. The signal acquisition probe system 20 has an uncorrected frequency response that rolls-off as the signal under test frequency increases. This roll-off is mainly due to the losses due to skin and dielectric effects of the cable. The phase shift and transient response of the balun 28 can be adjusted to compensate for the cable loss as well as broadening the frequency response of the balun.

Figure 3:
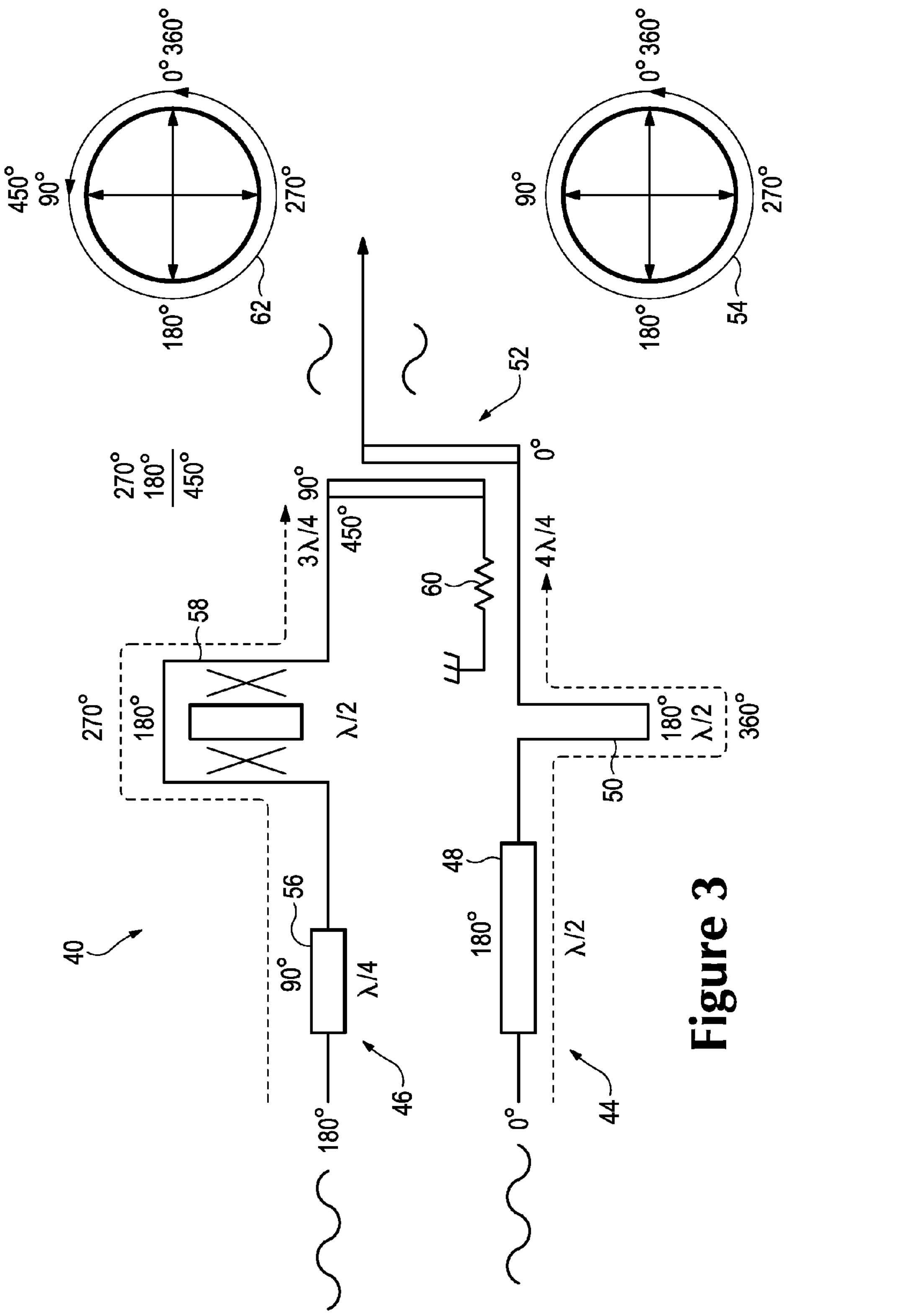
FIG. 3 illustrates one embodiment of the wideband balun structure according to the present invention.
Figure 4:
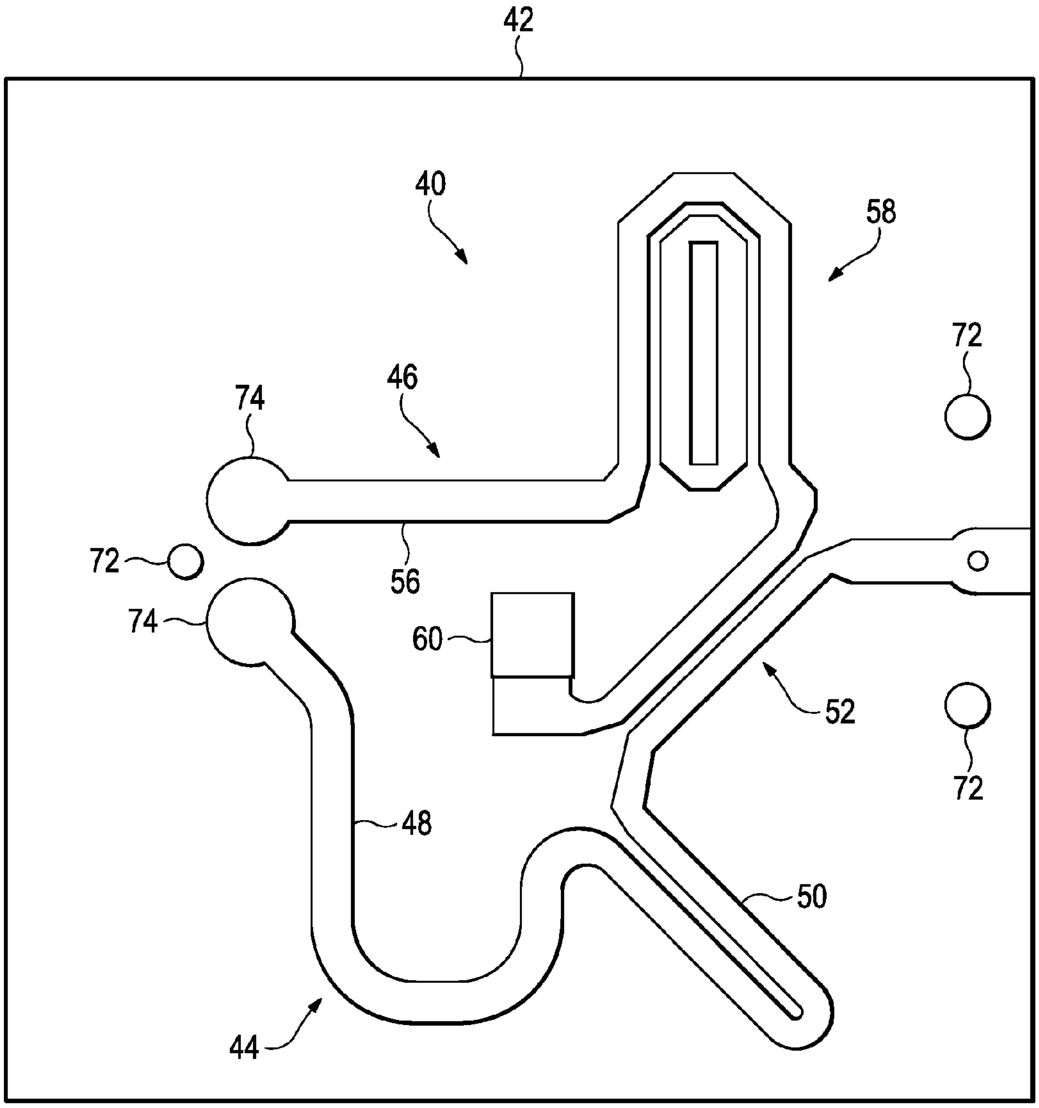
FIG. 4 show the physical layout of one embodiment of the wideband balun structure according to the present invention.

FIGS. 3 and 4 illustrate one embodiment of a wideband balun structure 40 usable with the signal acquisition probe system 20. FIG. 3 is a schematic representation of the wideband balun structure 40 and FIG. 4 is the physical layout of the wideband balun structure 40 on a dielectric substrate 42. The positive going differential signal is represented in FIG. 3 as having a 0° phase shift and is input to one of the signal paths 44 of the wideband balun structure 40. The negative going differential signal is represented in FIG. 3 as having a 180° phase shift and is input to the other signal path 46 of the wideband balun structure 40. The positive going differential signal is coupled via a circuit trace 48 having λ/2 or 180° phase shift to one end of a first order phase shaper 50 having λ/2 or 180° phase shift. The other end of the first order phase shaper 50 is coupled to a Port 1 input of a 90° hybrid 52. Internally, the 90° hybrid 52 couples Port 1 with Port 2 that functions as an output port. The positive going differential signal at the Port 1 input to the 90° hybrid 52 has been phase shifted 4λ/4 or 360° from the input signal path 44 input as represented by the phase circle 54. The negative going differential signal is coupled via circuit trace 56 having a λ/4 or 90° phase shift to one of a λ/2 or 180° second order phase shaper 58. The other end of the second order phase shaper 58 is coupled to a Port 3 input of the 90° hybrid 52. Internally, the 90° hybrid 52 couples Port 3 with Port 4. Port 4 is coupled to ground via a termination resistor 60. The negative going differential signal which is 180° out of phase with the positive going input signal has been phase shifted 3λ4 or 270° from the input signal path 46 input. As a result, the signal at the Port 3 input of the 90° hybrid is phase shifted 450° (180°+270° ) relative to the positive going differential signal as represented by the phase circle 62.

The wideband balun structure 40 of FIG. 4 is implemented using a stripline structure. A microstrip structure may also be used in implementing the wideband balun structure 40. The wideband balun structure 40 is disposed between two parallel ground planes with the wideband balun structure 40 separated from the parallel ground planes by dielectric layers 42 of which one is shown. The dielectric layers 42 are preferably formed of Arlon 350 dielectric material with the stripline structure formed in copper. The parallel ground planes are electrically coupled together by vias 72 formed in the dielectric layers. The stripline wideband balun structure 40 is deposited on a surface of one of the dielectric layers 42. Input pads 74 are formed on the dielectric layer 42 for coupling the signal under test to the signal paths 44 and 46. The signal path 44 carrying the positive going differential signal has a somewhat U-shaped circuit trace 48 having a phase shift of 180°. The circuit trace 48 is coupled to one end of the 180° first order phase shaper 50. The other end of the 180° first order phase shaper is coupled to Port 1 of the 90° hybrid 52. The signal path 46 carrying the negative going differential signal has a straight circuit trace 56 having a phase shift of 90°. The circuit trace 56 is coupled to one end of a second order phase shaper 58. The other end of the second order phase shaper 58 is coupled to Port 3 of the 90° hybrid. Port 3 of the 90° hybrid is coupled to Port 4 of the 90° hybrid which in turn is coupled to ground by the termination resistor 60. Port 1 of the 90° hybrid is coupled to Port 2 of the 90° hybrid and function as the output port for the wideband balun 40. The wideband balun structure 40 has been described as receiving a differential signal and outputting a single end output signal. The signal flow of the wideband balun structure may equally be employed for receiving a single ended input signal and outputting a differential output signal.

The 90° hybrid 52 has an S-shaped phase response from its Port 3 input (90° input) to its Port 2 output. The phase response of the 90° hybrid 52 from its Port 1 input (0° Input) to its Port 2 output is linear. The first order phase shifter 50 provides an opposing S-shaped phase response to compensate for the S-shaped phase response through the 90° hybrid 52 from its Port 3 input to its Port 2 output. The combination of the first and second order phase shapers 50 and 58 extend the bandwidth of the wideband balun structure 40 by preserving the 180° phase difference of the differential input signal across a wider frequency band. This is achieved by reducing the out of phase difference between the positive going differential signal and the inverted negative going input signal through the 90° hybrid so as to increase the signal coupling between the positive going and negative going differential signals outside the normal bandwidth of the 90° hybrid. Further, the first and second phase shapers 50 and 58 correct the phase shift to improve the transient response of the wideband balun 40 for compensating the signal acquisition probe system 20 for cable loss.

Figure 5:
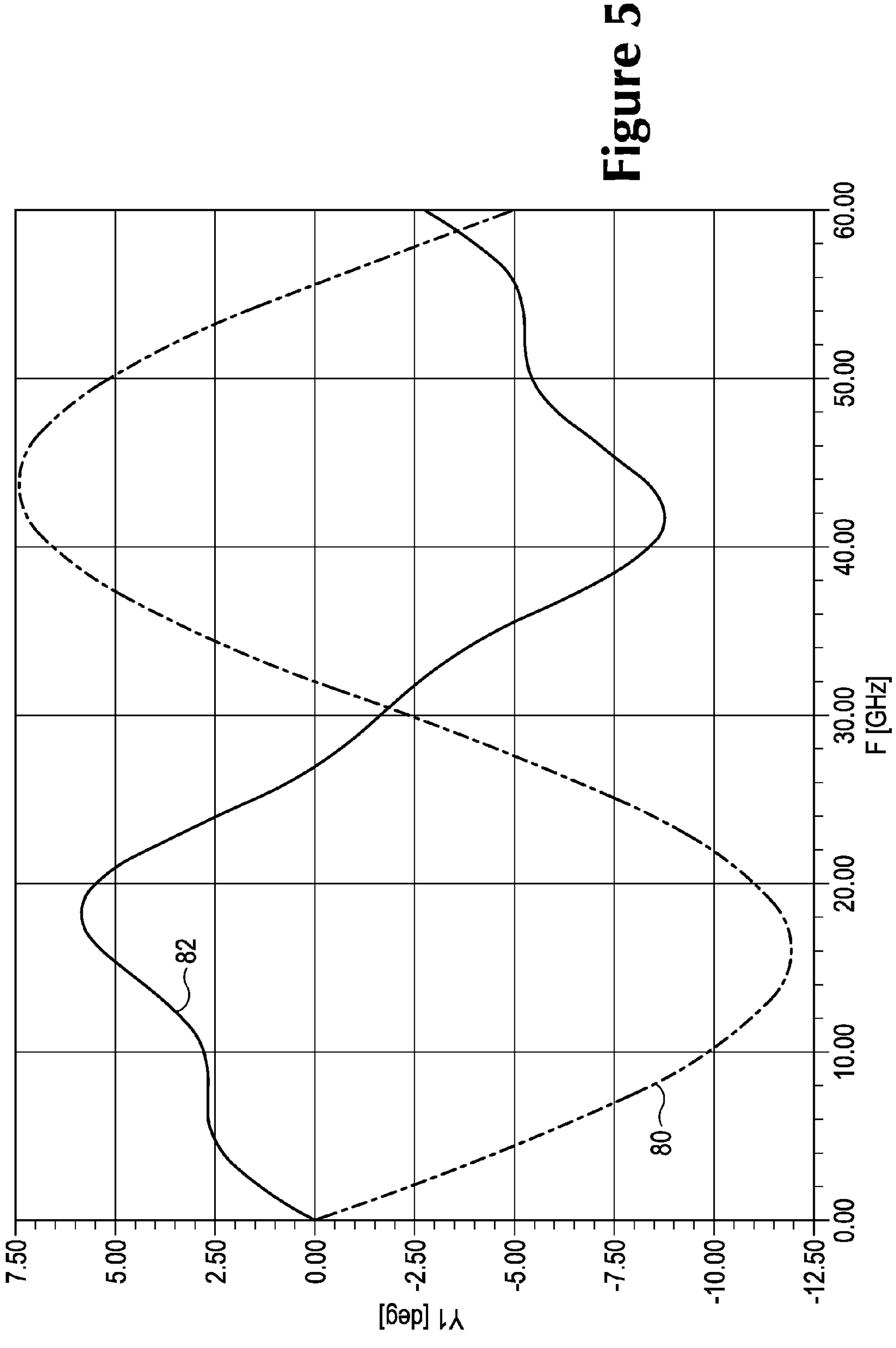
FIG. 5 shows the relative phases of a typical balun and the wideband balun according to the present invention.

Referring to FIG. 5, there is shown a dashed line 80 representing the relative phase of a balun having a 90° hybrid with a 90° phase shift line and a solid line 82 representing the relative phase of the corrected wideband balun structure 40. The dashed line 80 shows the relative phase of the differential signal pair going negative with an increase in frequency. This results in the transient response of the 90° hybrid with a 90° phase shift line having pre-shoot 84 prior to the rising edge 86 in the transient response curve as represented by the dashed line 88 in FIG. 6. The pre-shoot 84 is caused by the negative going differential signal leading the positive going differential signal in the 90° degree hybrid which causes the 90° hybrid to generate an initial negative output at its port 2 output.

Figure 6:
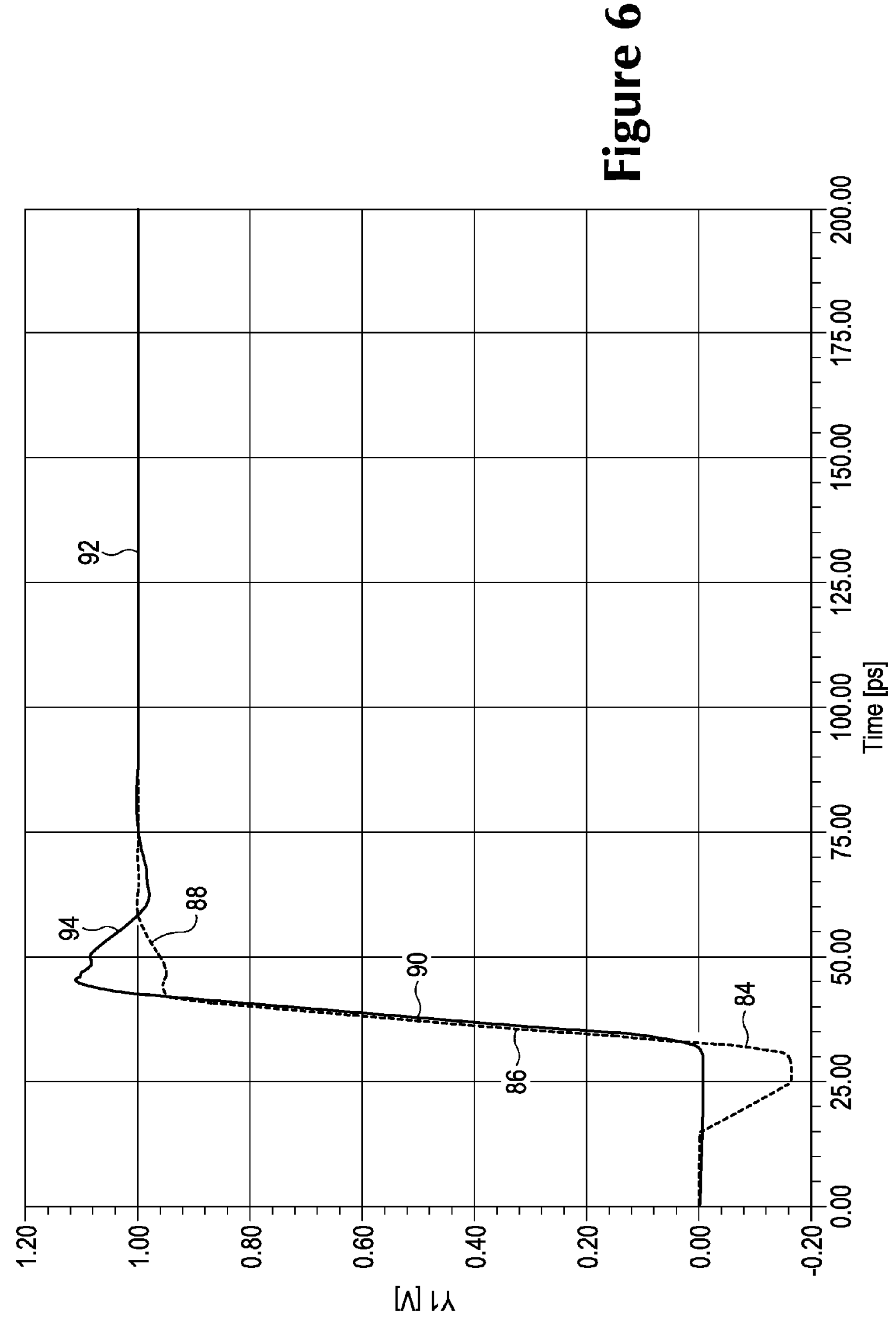
FIG. 6 shows the transient response curves for a typical balun and the wideband balun according to the present invention.

The solid line 82 shows the relative phase of the differential signal pair going positive with the shape of the positive going relative phase being modified by the first and second order phase shapers 50 and 58 to substantially reduce the pre-shoot prior to the rising edge 90 in the transient response curve of the corrected wideband balun 40 as represented by the solid line 92 in FIG. 6. The result of the relative phase of the differential pair going positive substantially reduces the pre-shoot in the transient response curve and causes overshoot 94 in the transient response curve of the corrected wideband balun 40. The overshoot 94 is caused by the positive going differential signal leading the negative going differential signal in the 90° degree hybrid which causes the 90° hybrid to generate an initial positive output at its Port 2 output.

Figure 7:
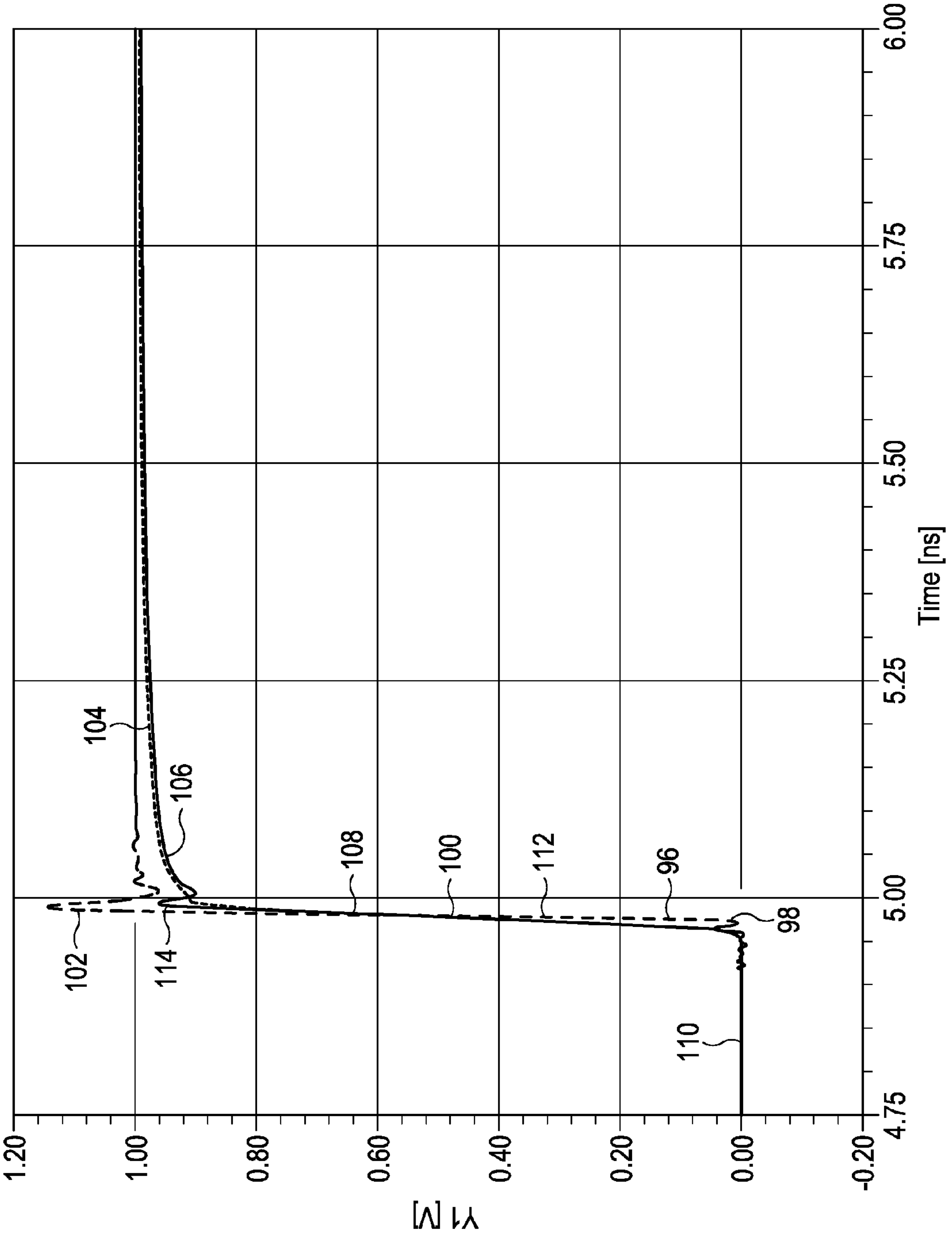
FIG. 7 shows the transient responses of a signal cable, the balun according to the present invention and a system having a combination of the wideband balun and the signal cable.

FIG. 7 shows the transient responses of a representative cable, such as cable 30 in the signal acquisition probe system 20, the wideband balun 40 of the present invention, and a system having a combination of the wideband balun 40 and the cable 30. The dashed line 96 represents the transient response of the wideband balun 40 showing a small aberration 98 at the bottom of the rising edge 100 and overshoot 102 at the top of the rising edge 100. As can be seen by the dashed line, there is substantially no pre-shoot in the transient response of the wideband balun 40. In actual implementation, the transient response of the wideband balun 40 has a specification allowing for ten percent pre-shoot. This is the result of variations in the manufacturing processes for the wideband balun 40. The dotted line 104 represents the transient response of the cable showing a rounded corner 106 at the top of the rising edge 108. The solid line 110 represents the combination of the wideband balun 40 and the cable 30. There is no pre-shoot prior to the rising edge 112. The transient response at the top of the rising edge 112 has initial overshoot 114 and then decreases to follow the transient response of the cable 30.

Figure 8:
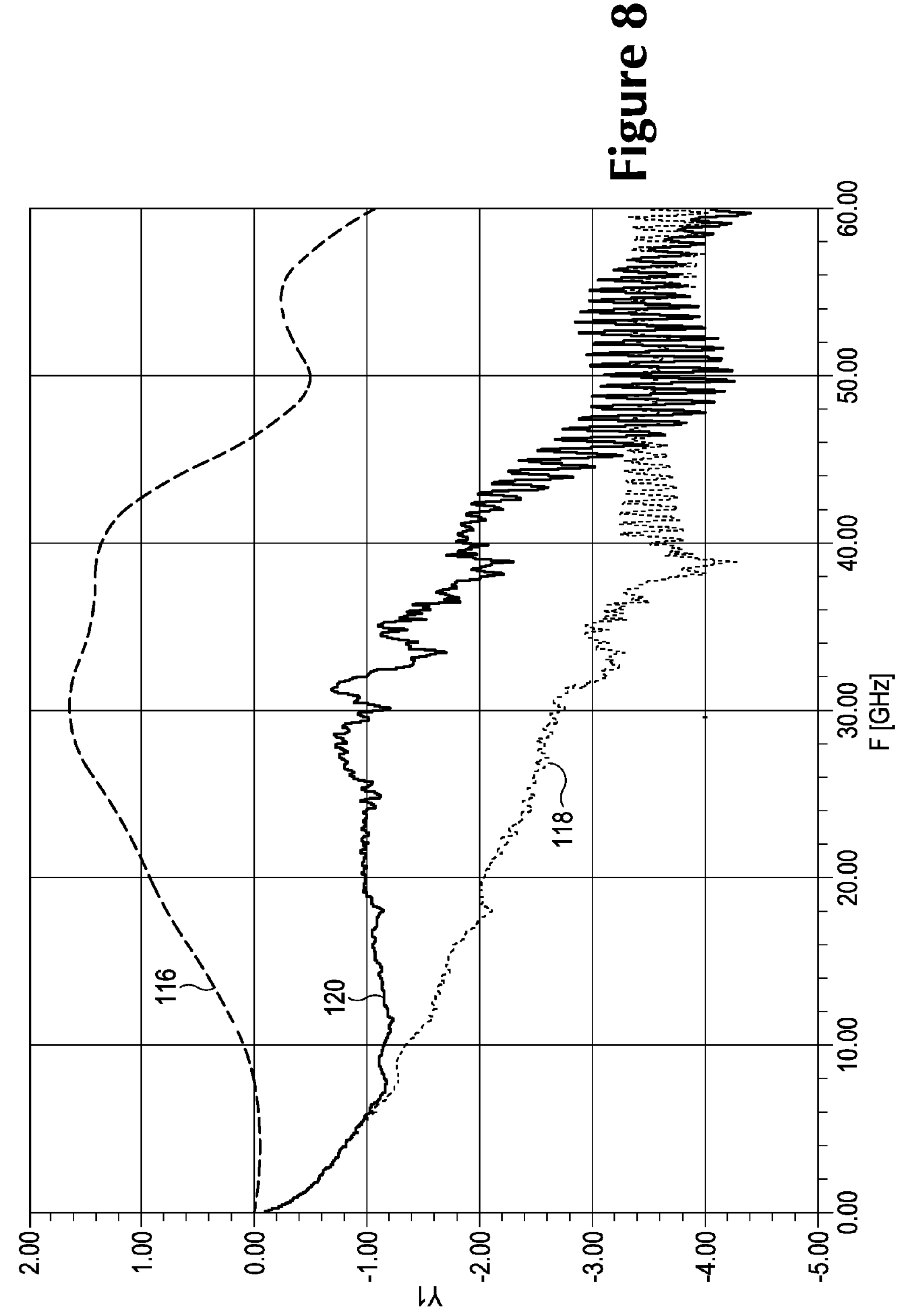
FIG. 8 shows the frequency responses of a signal cable the balun according to the present invention and a system having a combination of the wideband balun and the signal cable.

Referring to FIG. 8, there is shown the frequency response of the cable 30, the wideband balun 40 and a system consisting of the wideband balun 40 and the cable 30. The dashed line 116 represents the frequency response of the wideband balun 40. The dashed line 118 represents the frequency response of the cable 30. The solid line 120 represents the frequency response of the wideband balun 40 and the cable 30 system. The wideband balun 40 frequency response 116 decreases slightly from DC to approximately 8 GHz and then increases approximately 1.6 dBV to 30 GHz. The frequency response decreases approximately 0.2 dBV from 30 GHz to 40 GHz and then decreases approximately 1.8 dBV from 40 GHz to 50 GHz. The frequency response 118 of the cable 30 decreases approximately 2.7 dBV from DC to 30 GHz and then decreases a further 1.6 dBV from 30 GHz to 39 GHz, whereupon it increases approximately 0.6 dBv to 45 GHz. The increasing frequency response 116 of the wideband balun 40 compensates the decreasing frequency response 118 of the cable 30 to produce a balun and cable system response 120 having approximately 1.2 dBV loss from DC to 30 GHz and approximately 1.8 dBv of additional loss from 30 GHz to 44.5 GHz.

It will be obvious to those having skill in the art that many changes may be made to the details of the above-described embodiments of this invention without departing from the underlying principles thereof. The scope of the present invention should, therefore, be determined only by the following claims

What is claimed is:

1. A wideband balun structure comprising:

a first signal path for a positive going differential signal and a second signal path for a negative going differential signal;

a ninety-degree hybrid coupled to the first signal path for receiving the positive going differential signal at a first port and coupled to the second signal path for receiving the negative going differential signal at a second port with a third port of the ninety-degree hybrid coupled to the first port and functioning as an output port and a fourth port of the ninety-degree hybrid coupled to the second port and coupled to signal ground via a termination resistor; and a signal cable coupled to the output port;

wherein the first signal path has a first phase shaper and the second signal path has a second order phase shaper for compensating for the signal loss caused by the signal cable and providing a frequency band from DC to at least 15 GHz and a transient response having less than ten percent pre-shoot.

2. The wide bandwidth balun structure as recited in claim 1 wherein the first signal path has a circuit trace providing a lambda-over-two phase shift and the first phase shaper providing a lambda-over-two phase shift resulting in a three hundred and sixty degree phase shift at Port 1 of the ninety degree hybrid.

3. The wide bandwidth balun structure as recited in claim 1 wherein the second signal path has a circuit trace providing a lambda-over-four phase shift and the second order phase shaper providing a lambda-over-two phase shift resulting in a two hundred and seventy degree phase shift at the output of the second order phase shifter which when added to the one hundred and eighty degree phase shift of the negative going differential signal results in a four hundred and fifty degree phase shift at Port 2 of the ninety degree hybrid.

4. The wide bandwidth balun structure as recited in claim 1 wherein the balun structure is formed as a stripline structure.

* * * * *